United States Patent
Peucat et al.

(10) Patent No.: US 8,448,426 B2
(45) Date of Patent: May 28, 2013

(54) METHOD FOR HEATING AN SCR SYSTEM USING RESISTIVE HEATING ELEMENTS

(75) Inventors: Frederic Peucat, Brussels (BE); Nicolas Duret, Nancy (FR); Jean-Claude Habumuremyi, Haaltert (BE); Francois Dougnier, Boortmeerbeek (BE); Stephane Leonard, Brussels (BE); Claude Mesjasz, Ganshoren (BE)

(73) Assignee: Inergy Automotive Systems Research, Brussels (BE)

( * ) Notice: Subject to any disclaimer, the term of this patent is extended or adjusted under 35 U.S.C. 154(b) by 339 days.

(21) Appl. No.: 12/677,643

(22) PCT Filed: Sep. 12, 2008

(86) PCT No.: PCT/EP2008/062183
§ 371 (c)(1),
(2), (4) Date: Mar. 11, 2010

(87) PCT Pub. No.: WO2009/034175
PCT Pub. Date: Mar. 19, 2009

(65) Prior Publication Data
US 2010/0186374 A1    Jul. 29, 2010

(30) Foreign Application Priority Data
Sep. 14, 2007   (FR) ..................... 07 57591

(51) Int. Cl.
*F01N 3/00*    (2006.01)
(52) U.S. Cl.
USPC ............................................ 60/295; 60/301
(58) Field of Classification Search
USPC ................ 222/146.5; 60/286, 295, 277, 284, 60/285; 73/114.45, 114.48, 114.49
See application file for complete search history.

(56) References Cited

U.S. PATENT DOCUMENTS

| | | | |
|---|---|---|---|
| 2,843,759 A | 7/1958 | Roots | |
| 5,884,475 A | 3/1999 | Hofmann et al. | |
| 6,311,868 B1 * | 11/2001 | Krietemeier et al. | 222/1 |
| 6,442,932 B1 * | 9/2002 | Hofmann et al. | 60/274 |
| 8,096,112 B2 * | 1/2012 | Dalton | 60/295 |

(Continued)

FOREIGN PATENT DOCUMENTS

| | | |
|---|---|---|
| DE | 4035673 A1 * | 5/1992 |
| DE | 4432576 A1 | 3/1996 |

(Continued)

OTHER PUBLICATIONS

DIN 70070 (Aug. 2003-Aug. 2005) standard : Diesel engines NOx•Reduction agent AUS 32 Quality requirements; 15 pgs including a machine translation in English.

(Continued)

*Primary Examiner* — Thomas Denion
*Assistant Examiner* — Patrick Maines
(74) *Attorney, Agent, or Firm* — Oblon, Spivak, McClelland, Maier & Neustadt, L.L.P.

(57) ABSTRACT

Method for heating a urea SCR system using at least two resistive heating elements (R1, R2), one of which (R1) is intended for heating one or some (part(s) of) component(s) always in contact with a substantial amount of urea and the other (R2) is intended for heating one or some (part(s) of) component(s) which are sometimes not in contact with a substantial amount of urea, and according to which, when starting the system in freezing conditions, the resistive element R1 is activated but the resistive element R2 is activated only when its component is actually in contact with a substantial amount of urea.

12 Claims, 2 Drawing Sheets

U.S. PATENT DOCUMENTS

| | | | |
|---|---|---|---|
| 2003/0033799 A1* | 2/2003 | Scheying | 60/286 |
| 2007/0035832 A1* | 2/2007 | Hirata et al. | 359/484 |
| 2008/0256937 A1* | 10/2008 | Suzuki | 60/300 |
| 2009/0078692 A1 | 3/2009 | Starck | |
| 2010/0078426 A1* | 4/2010 | Li et al. | 219/600 |
| 2010/0229532 A1* | 9/2010 | Ohno | 60/274 |
| 2011/0283677 A1* | 11/2011 | Kaefer | 60/274 |
| 2012/0186334 A1* | 7/2012 | Steinhauser et al. | 73/61.76 |

FOREIGN PATENT DOCUMENTS

| | | |
|---|---|---|
| DE | 102004061259 A1 | 7/2006 |
| FR | 2917791 A1 | 12/2008 |
| FR | 2919456 A1 | 1/2009 |
| WO | WO 2006064001 A1 | 6/2006 |
| WO | WO 2007017080 A1 | 2/2007 |
| WO | WO 2008155303 A1 | 12/2008 |
| WO | WO 2009013329 A1 | 1/2009 |

OTHER PUBLICATIONS

U.S. Appl. No. 12/670,275, Naydenov et al, WO2009013329.
Office Action and Search Report issued Feb. 6, 2013, in Chinese Patent Application No. 200880109717.2, filed Sep. 12, 2008 (English language).

* cited by examiner

METHOD FOR HEATING AN SCR SYSTEM USING RESISTIVE HEATING ELEMENTS

CROSS-REFERENCE TO RELATED APPLICATIONS

This application is a U.S. national stage application under 35 U.S.C. §371 of International Application No. PCT/EP2008/062183 filed Sep. 12, 2008, which claims priority to French Patent Application No. 07.57591 filed Sep. 14, 2007, these applications being incorporated herein by reference in their entirety for all purposes.

The present application relates to a method for heating an SCR system using resistive heating elements and also to an SCR system suitable for the application of this method.

BACKGROUND OF THE INVENTION

Legislation on vehicle and heavy goods vehicle emissions stipulates, amongst other things, a reduction in the release of nitrogen oxides NO into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also a device for metering the desired amount of additive and injecting it into the exhaust line.

Given that the aqueous urea solution generally used for this purpose (eutectic 32.5 wt % urea solution) freezes at −11° C., it is necessary to provide a heating device to liquefy the solution in order to be able to inject it into the exhaust line in the event of starting in freezing conditions.

Several systems have been provided in the prior art for this purpose. Generally, these systems comprise heating devices that involve either specific heating elements or a bypass of the engine cooling circuit (for example, see Application WO 2006/064001 in the name of the Applicant).

As regards the use of specific heating elements, it is known to put resistive heating elements inside the tank containing the urea solution, and optionally over the urea lines (feed lines and return lines, where appropriate), over the pump, the filter, etc. and other active components of the system.

Thus, for example, Application DE 10 2004 061 259 describes a system that uses separate resistive elements for the tank, pump, metering module and urea feed and return lines. This system uses temperature probes present in the tank, pump and metering module and when one of these probes indicates a temperature below a given threshold value (generally the freezing temperature of the solution), all these resistors are activated so as to thaw the whole of the system. Such a strategy has several drawbacks.

Firstly, when starting a vehicle in cold (freezing) weather, all of the electrical devices (for de-icing the glass panes, heating the passenger compartment, etc.) are generally started up simultaneously, which causes a peak in electric consumption to which that of heating the SCR system is then added.

Next, it should be noted that certain parts of an SCR system may sometimes contain the urea solution and sometimes not (cf., for example, the upper part of the tank and the lines in the case where the latter are purged). Therefore, the fact of heating these parts when they do not contain liquid needlessly consumes power and can also lead to the premature degradation of the resistive elements in these zones.

SUMMARY OF THE INVENTION

The present invention aims to solve these problems and is based on the idea of uncoupling the resistive elements so as to be able, when starting an SCR system in the event of freezing, to activate only those intended for heating components (or parts of components) actually in contact with a substantial amount of urea and to possibly activate the others at a later time.

Therefore, the present application relates to a method for heating a urea SCR system using at least two resistive heating elements (R1, R2), one of which (R1) is intended for heating one or some (parts of) component(s) always in contact with a substantial amount of urea and the other (R2) is intended for heating one or some (parts of) component(s) which are sometimes not in contact with a substantial amount of urea, and according to which, when starting the system in freezing conditions, the resistive element R1 is activated but the resistive element R2 is activated only if its component is actually in contact with a substantial amount of urea.

The expression "SCR system" is understood to mean a system for the catalytic reduction of the $NO_x$ from the exhaust gases of an internal combustion engine, preferably of a vehicle, using urea as a liquid ammonia precursor.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

As mentioned previously, SCR systems generally comprise at least one tank for storing the urea solution and also a system for feeding this to the exhaust gases, and which generally comprises active components such as a pump, filter, valve(s), conduits (feed and/or return conduits). The method according to the invention applies to any component of such a system, any part of such a component and any combination of such components (or even to a complete SCR system).

BRIEF DESCRIPTION OF THE DRAWINGS

The foregoing, features and advantages of the invention will become apparent from the following description of example embodiments with reference to the accompanying drawings wherein.

DETAILED DESCRIPTION OF THE PREFERRED EMBODIMENTS

Figure 1:
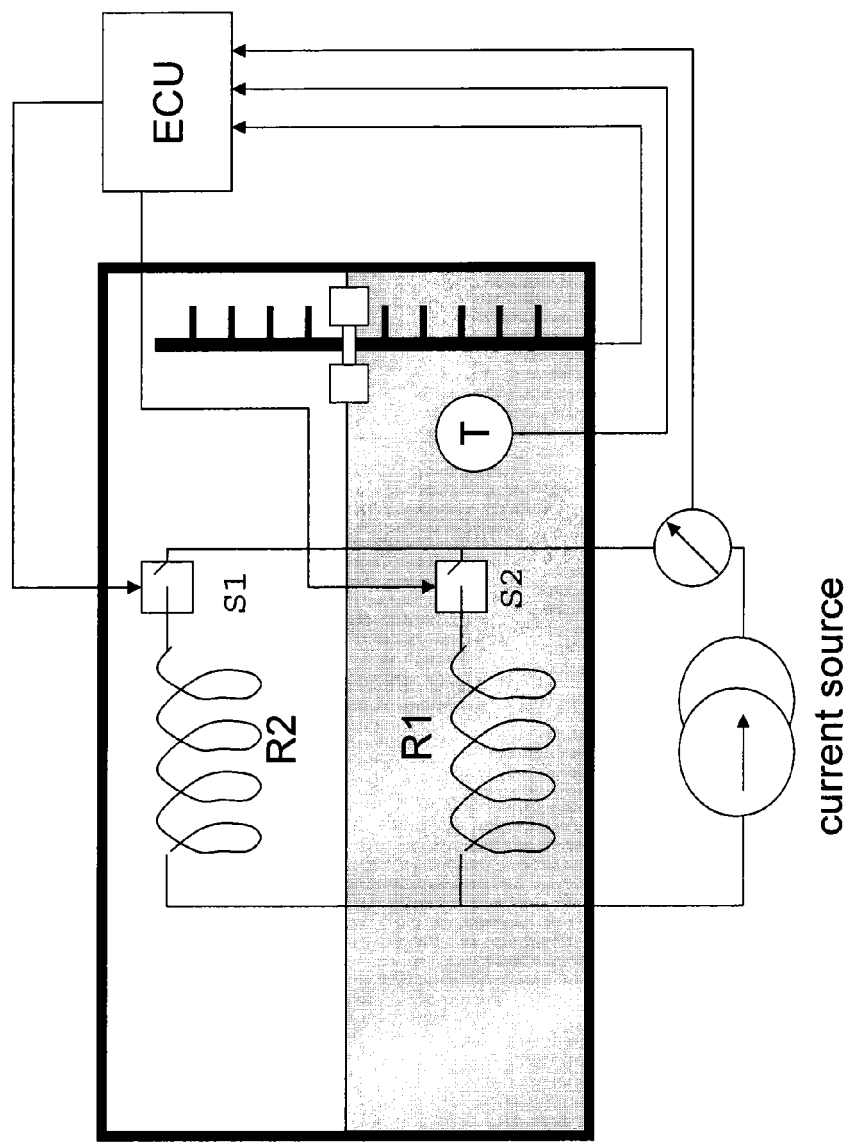
FIG. 1 illustrates one exemplary embodiment of the present invention.

The method according to the invention uses at least two separate resistive elements that can be activated (heated) independently. They are preferably connected in parallel to one and the same current source (which does not rule out the possibility of the heating system also comprising one or more other resistive elements connected in series). This source may be the battery of the vehicle which supplies around 13.5 volts nominal (generally with a minimum of 9 volts and a maximum of 16 volts). The fact of connecting the resistors in parallel also makes it easier to diagnose their failure, where necessary (see Application FR 0756740 in the name of the Applicant, the content of which is incorporated for this purpose by reference into the present application).

The resistive heating elements may be metallic heating filaments, flexible heaters, (that is to say heaters comprising one or more resistive track(s) affixed to a film or placed between two films (that is to say two substantially flat supports, the material and thickness of which are such that they are flexible)) or any other type of resistive elements that have a shape, size and flexibility suitable for being inserted into and/or wound around the components of the SCR system. For the tank and its base plate (i.e. a mounting plate that integrates at least one and preferably all the active components of the system, namely pump, filter, gauge, etc.), where appropriate, flexible heaters are particularly suitable.

According to the invention, at least one resistive element is intended for heating a component (or one part of a component) which is sometimes not in contact with a substantial amount of urea. This is understood to mean that its positioning is such that sometimes it is in contact with, or even submerged in, the urea (liquid or solid, i.e. frozen) and sometimes it is mainly, or even essentially, in contact with a gaseous phase present in the system.

Still according to the invention, this element is only activated (heated) on starting the SCR system in freezing conditions when its component is actually in contact with a substantial amount of liquid or solid urea (and preferably completely filled with or submerged in it). Within the context of the invention, the expression "freezing conditions" is generally understood to mean an ambient temperature below $-5°$ C. This is because, theoretically, eutectic urea solutions begin to freeze around $-8°$ C. However, taking into account their ageing, it is not uncommon for them to begin to freeze around $-5°$ C.

The system according to the invention preferably uses at least one temperature sensor and preferably at least two sensors: one located inside the tank and one located in the line or lines.

Therefore, if during the starting of the system this (these) sensor(s) detects (detect) a temperature less than or equal to the threshold value ($T_{threshold}$, preferably equal to $-5°$ C.: see above), the method according to the invention is applied.

In order to do this, the system according to the invention generally uses an electronic control unit (ECU) that acts on relays that make it possible to specifically activate/deactivate (i.e. supply with current or not) each of the resistors as a function of the information received from the sensor(s).

As illustrated in FIG. 1, in a first exemplary embodiment of the invention the SCR system comprises a tank equipped with at least two resistive elements (R1, R2). Resistive element, (R2) is located in an upper part of the tank and not activated when it is not submerged.

According to the first exemplary embodiment the resistive elements may be physically separate components. Alternatively and preferably, there may be at least two resistive tracks affixed to one and the same support but which are independent (i.e. can be activated separately) and preferably either connected in parallel to one and the same power supply, or connected to separate power supplies, the first variant being particularly preferred.

It should be noted that there may be more than two separate resistors in the first exemplary embodiment, to refine the principle. In the case of a tank for which the gauge is a discrete gauge having several (n) levels (and which uses, for example, n "reed" bulbs), the SCR system preferably also comprises n (or a fraction of n) resistive heating elements, each of which corresponds to one level of the gauge and which can be activated/deactivated by the ECU as a function of the value read by the gauge.

In this variant of the first exemplary embodiment, the unsubmerged resistor(s) are preferably never activated (i.e. are not activated when the vehicle is being driven, once the SCR system has been started).

Figure 2:
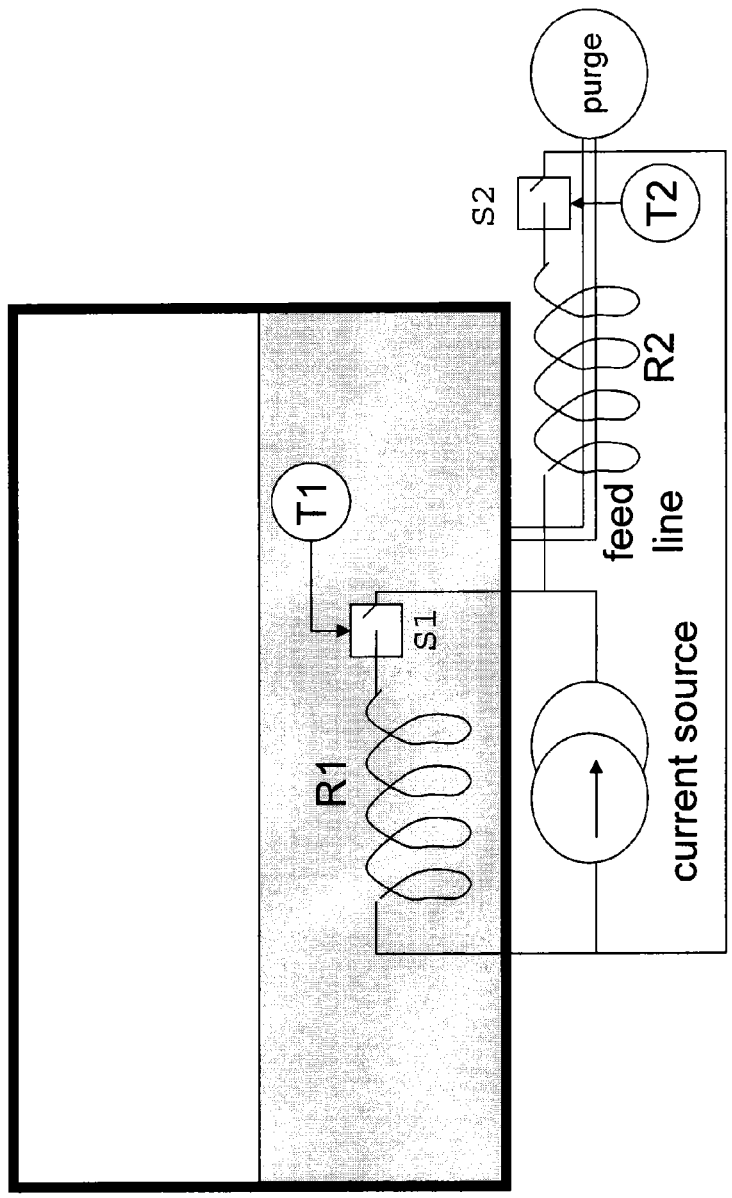
FIG. 2 illustrates another exemplary embodiment of the present invention.

As illustrated in FIG. 2, in a second exemplary embodiment of the invention, the SCR system comprises a urea tank equipped with a heating resistor (R1) and a urea feed line equipped with another heating resistor (R2), and also a device that makes it possible to purge the feed line each time the system is stopped; and in that, when starting the system in freezing conditions, the resistor R1 is activated but not the resistor R2, the latter only being activated (powered up) after a given time period. This time period is calculated empirically from tests at various ambient temperatures based on worst case scenarios, that is to say where the lines are not purged and are full of frozen urea. It is generally of the order of minutes (close to 10 minutes for example). The second exemplary embodiment can be used in combination with the first exemplary embodiment of FIG. 1.

In the method according to the second exemplary embodiment of the invention, the resistive elements are generally activated on starting, a minimum time before the pump of this system is put into operation. This minimum time is that required to melt a certain amount of urea, convey it to the pump and enable the latter to be started. This minimum time may be determined experimentally and the pump may be started automatically after this period. However, preferably, a theoretical minimum time is determined experimentally and/or by calculation but the pump is only definitively started after a verification (if need be an iterative verification) of the stability of the outlet pressure. In other words: the minimum time is that required to attain a stable pressure at the pump outlet, the heating of the resistive elements possibly being, for this purpose, intermittent. Such a method of starting the pump is described in Application FR 0755875 in the name of the Applicant, the content of which is, for this purpose, incorporated by reference into the present application.

When the SCR system also comprises a urea return line (i.e. when there is overmetering of the solution so that an amount not consumed by the injection system is returned to the tank), this line is generally also equipped with a resistor separate from the resistor R1 which may or may not be integrated into the resistor R2 (i.e. a single resistor may or may not heat the two lines).

In the method according to the second exemplary embodiment of the invention, the heating of the SCR system is preferably also adjusted during the operation of the system (when the vehicle is being driven) in case of freezing. Preferably, this adjustment is carried out using simples switches (S1, S2) controlled as a function of the reading of the temperature sensors. Commercial sensors have an accuracy of around one ° C. Therefore it is advantageous to adjust over a wider range (e.g. of at least 2° C.) to prevent the untimely activation of the relays (MOSFET relays) and therefore to limit the wear thereof. In particular, it is advantageous for the tank and the line to each be equipped with a temperature sensor (T1, T2); for the heating of the SCR system to be adjusted during normal operation of the system using switches (S1, S2) controlled by the temperature sensors; and for the switches (S1, S2) to activate the resistors (R1, R2) when the temperature read by the corresponding sensor (T1, T2) drops below a threshold value ($T_{threshold}$, which is preferably equal to −5° C.) and to respectively deactivate R1 when the temperature read by T1 reaches/exceeds $T_{threshold}$+3° C. and R2 when the temperature read by T2 reaches/exceeds $T_{threshold}$+2° C. The Applicant has observed that it was pointless to heat the solution further and that, on the contrary, the fact of heating beyond this temperature degraded the heaters (owing to a higher rate of corrosion).

For the line sensor (which measures T2), this may be an ambient temperature sensor, giving information on the outside temperature. Therefore, it is possible to do away with this sensor if the information is available through the vehicle communication network (CAN or Controlled Area Network).

It should be noted that the method according to the second embodiment of the invention is also beneficial outside the context of the present invention, since its advantages are also observed with any heating system comprising at least one resistor, one temperature sensor and one system for controlling the resistor that uses the value read by the temperature sensor.

In alternative embodiments of the present invention (also beneficial outside the context of the present invention for any liquid capable of freezing and degrading), in order to prevent the temperature from being too high locally (which may occur if the heating rate is too high and when the heat does not have time to propagate/dissipate), it may be advantageous, in the method according to the invention, to vary the heating rate as a function of the change in temperature read by the sensor(s). In order to do this, recourse may be made to a specific controller, for example of the PID type.

The present invention relates generally to an SCR system comprising at least two resistive heating elements (R1, R2), one of which (R1) is intended for heating one or some (part(s) of) component(s) always in contact with a substantial amount of urea and the other (R2) is intended for heating one or some (part(s) of) component(s) which are sometimes not in contact with a substantial amount of urea, and also a control device that makes it possible, when starting the system in freezing conditions, to activate the resistive element R1 but to only activate the resistive element R2 when its component is actually in contact with a substantial amount of urea.

Preferably, this system comprises several resistive heating elements connected in parallel to a current source, and most particularly preferably, it also comprises a current sensor placed in series with the current source and all the resistors, which are connected in parallel, and a unit for detecting a malfunction of the system that makes it possible to interpret a signal emitted by the sensor.

This detection unit (or diagnostic unit) may be a specific ECU dedicated to this purpose. Alternatively and preferably, it is the same ECU as that which controls the heating and to which the sensor sends its signal (voltage, generally).

The advantageous alternatives described above in the context of the method can also be applied to the system according to the invention.

The invention claimed is:

1. A method for heating a urea SCR system that includes a plurality of resistive heating elements comprising:
   starting the urea SCR system in freezing conditions;
   activating a first resistive heating element when the urea system is stared in the freezing conditions, the first resistive heating element heating at least a first component or a first part of the first component which is constantly in contact with urea, and
   activating a second resistive heating element when the urea SCR system is started in the freezing conditions only when at least one of a second part of the first component, a second component, and a first part of the second component that is not in constant contact with the urea comes into contact with the urea, the second resistive heating element being activated independently of the activating of the first resistive heating element and heating the one of the second part of the first component, the second component, and the first part of the second component that comes into contact with the urea.

2. The method according to claim 1, wherein the first resistive element and second resistive element are connected in parallel to one and the same current source.

3. The method according to claim 1, further comprising:
   detecting a temperature with a temperature sensor; and
   activating or deactivating at least one of the plurality of resistive heating elements with an electronic control unit and a respective relay when the temperature detected with the temperature sensor is less than or equal to a first threshold temperature.

4. The method according to claim 1, wherein the urea SCR system comprises a tank equipped with the first resistive heating element and the second resistive heating element, the second resistive heating element being located in an upper part of the tank and is not activated when the second resistive heating element is not submerged in the urea.

5. The method according to claim 4, further comprising:
   receiving a signal with a control unit from a discrete level gauge having a plurality of levels indicating the level of urea in the tank, wherein at least one of the plurality of resistive heating elements including the first resistive heating element and the second resistive heating element, corresponds to each of the plurality of levels of the discrete level gauge; and
   activating or deactivating at least one of the plurality of resistive heating elements that corresponds to one of the plurality of levels based on a signal from the discrete level gauge.

6. The method according to claim 4, wherein each of the plurality of resistive heating elements that is not submerged in the urea is not activated.

7. The method according to claim 1, further comprising:
   stopping the urea SCR system;
   purging a urea feed line connected to a tank with a purging device when the SCR system is stopped, wherein the tank is equipped with the first resistive heating element and the urea feed line is equipped with the second resistive heating element;
   starting the urea SCR system in the freezing conditions;
   activating the first resistive heating element;
   activating the second resistive heating element only after a given time period and independently of the activating of the first resistive heating element.

8. The method according to claim 7, further comprising:
detecting a temperature in the urea feed line with a feed line temperature sensor during a normal operation of the urea SCR system;
detecting a temperature in the tank with a tank temperature sensor during the normal operation of the urea SCR system;
adjusting the heating of the SCR system with at least one of the tank temperature sensor controlling a first switch and the feed line temperature sensor controlling a second switch;
activating the first resistive heating element with the first switch when the temperature in the tank drops below a first threshold temperature;
activating the second resistive heating element with the second switch when the temperature in the urea feed line drops below the first threshold temperature;
deactivating the first resistive heating element with the first switch when the temperature in the tank is greater than or equal to the first threshold temperature plus 3° C.; and
deactivating the second resistive heating element with the second switch when the temperature in the urea feed line is greater than or equal to the first threshold temperature plus 2° C.

9. The method according to claim 8, wherein a heating rate of the first resistive heating element and a heating rate of the second resistive heating element vary as a function of a change in temperature detected by the tank temperature sensor and the feed line temperature sensor respectively.

10. The method according to claim 1, further comprising:
activating at least one of the plurality of resistive heating elements including the first resistive heating element and the second resistive heating element for a predetermined minimum time; and
starting a pump of the urea SCR system after the predetermined minimum time, wherein the predetermined minimum time is a time that is required to attain a stable pressure at a pump outlet.

11. An SCR system with a plurality of resistive heating elements comprising:
a first resistive heating element heating at least one of a first component and a first part of the first component that is in constant contact with urea;
a second resistive heating element heating at least one of a second part of the first component, a second component, and a first part of the second component that is not in constant contact with the urea, wherein the second resistive heating element is activated for heating only when the at least one of the second part of the first component, the second component, and the second part of the second component comes in contact with the urea; and
further comprising an electronic control unit programmed to activate the first resistive heating element when the urea SCR system is started in freezing conditions and activate the second resistive heating element when the urea SCR system is started in freezing conditions when the at least one of the second part of the first component, the second component, and the first part of the second component is actually in contact with the urea.

12. The SCR system according to claim 11, further comprising:
a current source, wherein the plurality of resistive heating elements including the first resistive heating element and the second resistive heating element are connected in parallel to the current source;
a current sensor placed in series with the current source and the plurality of resistors; and
wherein the electronic control unit receives a signal from the current sensor and detects a malfunction of the SCR system.

* * * * *